United States Patent
Oliveira

(10) Patent No.: US 9,961,243 B2
(45) Date of Patent: *May 1, 2018

(54) ATTACHABLE SMARTPHONE CAMERA

(71) Applicant: Rui Pedro Oliveira, Oporto (PT)

(72) Inventor: Rui Pedro Oliveira, Oporto (PT)

(73) Assignee: Rui Pedro Oliveria, Oporto (PT)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/332,209

(22) Filed: Oct. 24, 2016

(65) Prior Publication Data

US 2017/0041516 A1 Feb. 9, 2017

Related U.S. Application Data

(63) Continuation of application No. 14/248,745, filed on Apr. 9, 2014, now Pat. No. 9,503,625.
(Continued)

(51) Int. Cl.
*H04N 5/225* (2006.01)
*H04N 5/232* (2006.01)
*H04M 1/725* (2006.01)

(52) U.S. Cl.
CPC ...... *H04N 5/2252* (2013.01); *H04M 1/72527* (2013.01); *H04N 5/2254* (2013.01);
(Continued)

(58) Field of Classification Search
CPC ............. H04N 5/2252; H04N 5/23293; H04N 5/2254; H04N 5/23206; H04N 5/23296;
(Continued)

(56) References Cited

U.S. PATENT DOCUMENTS

| 4,429,972 A | 2/1984 | Yamamichi et al. |
| 6,400,903 B1 | 6/2002 | Conoval |

(Continued)

FOREIGN PATENT DOCUMENTS

| EP | 1 033 876 A1 | 9/2000 |
| EP | 1 096 771 A1 | 5/2001 |

(Continued)

OTHER PUBLICATIONS

Invitation to Pay Additional Fees/Partial International Search for Application No. PCT/IB2014/001541, dated Dec. 12, 2014 (7 pages).

(Continued)

*Primary Examiner* — Padma Haliyur
(74) *Attorney, Agent, or Firm* — Nutter McClennen & Fish LLP; John J. Penny, Jr.

(57) ABSTRACT

Systems and methods are disclosed herein that generally involve a camera system including a high-quality lens which is selectively attachable to a mobile device, effectively replacing the mobile device's integral lens. The attachable camera system can leverage existing features of the mobile device, such as the display, battery, storage, and sharing functions, allowing the camera system itself to be a relatively simple, lightweight, portable, and inexpensive device. The ability to selectively attach and detach the camera system from the mobile device allows the camera system to be removed when it is desired to maintain the mobile device's favorable weight, size, and ergonomic characteristics. When high quality image or video capture or increased camera flexibility and functionality is desired, the camera system can be attached to the mobile device.

11 Claims, 12 Drawing Sheets

Related U.S. Application Data

(60) Provisional application No. 61/809,922, filed on Apr. 9, 2013.

(52) U.S. Cl.
CPC .......... *H04N 5/232* (2013.01); *H04N 5/2327* (2013.01); *H04N 5/23206* (2013.01); *H04N 5/23216* (2013.01); *H04N 5/23241* (2013.01); *H04N 5/23245* (2013.01); *H04N 5/23293* (2013.01); *H04N 5/23296* (2013.01)

(58) Field of Classification Search
CPC ............... H04N 5/232; H04N 5/23241; H04N 5/23216; H04N 5/23245; H04N 5/2327; H04M 1/72527
See application file for complete search history.

(56) References Cited

U.S. PATENT DOCUMENTS

| | | | |
|---|---|---|---|
| D465,504 S | 11/2002 | Van Klinken | |
| D480,741 S | 10/2003 | Berger et al. | |
| D504,904 S | 5/2005 | Nagai et al. | |
| D594,047 S | 6/2009 | Lee | |
| D614,223 S | 4/2010 | Kim et al. | |
| 8,041,201 B2 | 10/2011 | Eromaki et al. | |
| D668,283 S | 10/2012 | Ohno et al. | |
| D692,042 S | 10/2013 | Dawes et al. | |
| D692,939 S | 11/2013 | Huang et al. | |
| D733,780 S | 7/2015 | Chen | |
| D744,572 S | 12/2015 | Tabuchi | |
| 9,503,625 B2 | 11/2016 | Oliveira | |
| D792,497 S | 7/2017 | Oliviera | |
| 2002/0065872 A1 | 5/2002 | Genske et al. | |
| 2002/0186317 A1 | 12/2002 | Kayanuma | |
| 2004/0009789 A1 | 1/2004 | Park et al. | |
| 2004/0041911 A1 | 3/2004 | Odagiri et al. | |
| 2007/0280677 A1 | 12/2007 | Drake et al. | |
| 2010/0255875 A1 | 10/2010 | Oozeki | |
| 2012/0229901 A1 | 9/2012 | Moriya et al. | |
| 2012/0270599 A1 | 10/2012 | Mori et al. | |
| 2012/0282977 A1 | 11/2012 | Haleluk | |
| 2013/0002939 A1 | 1/2013 | O'Neill | |
| 2013/0178245 A1 | 7/2013 | Kulas | |
| 2013/0222668 A1 | 8/2013 | Anderson | |
| 2013/0331148 A1 | 12/2013 | Brough | |
| 2014/0132781 A1 | 5/2014 | Adams et al. | |
| 2014/0232930 A1 | 8/2014 | Anderson | |
| 2014/0300809 A1 | 10/2014 | Oliveira | |

FOREIGN PATENT DOCUMENTS

| | | |
|---|---|---|
| EP | 1 455 505 A1 | 9/2004 |
| JP | 10-013561 A | 1/1998 |
| JP | 2006-157398 A | 6/2006 |
| JP | 2007-312297 A | 11/2007 |

OTHER PUBLICATIONS

International Search Report and Written Opinion for Application No. PCT/IB2014/001541, dated Mar. 5, 2015 (17 pages).
Schmalstieg, et al, Virtual Realities, Dagstuhl Seminar 2008, Chapter 2, Augmented Reality 2.0, SpringerWien New Nork, 2011 (258 Pages).
Yam, Sony Lens Attachments Turns Smartphone Into Serious Camera, Tom's Guide US, Sep. 4, 2013 (Retrieved from http://www.tomsguide.com/us/sony-qx10-qx100-camera-smartphones,news-17486.html on Jan. 22, 2014) (7pages).
U.S. Appl. No. 14/248,745, filed Apr. 9, 2014, Attachable Smartphone Camera.
U.S. Appl. No. 29/487,514, filed Apr. 9, 2014, Attachable Smartphone Camera.

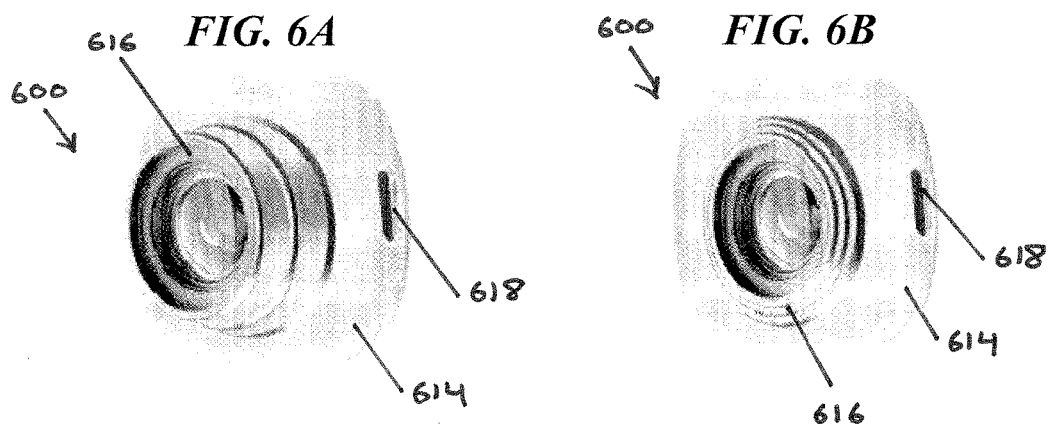
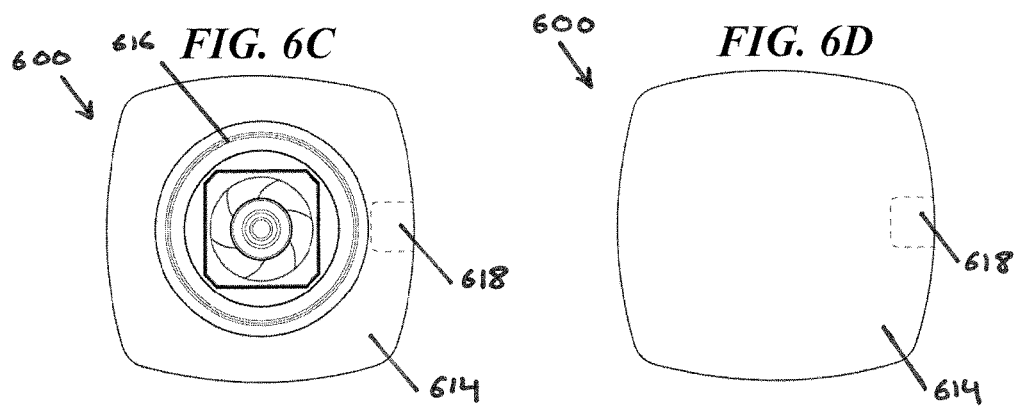
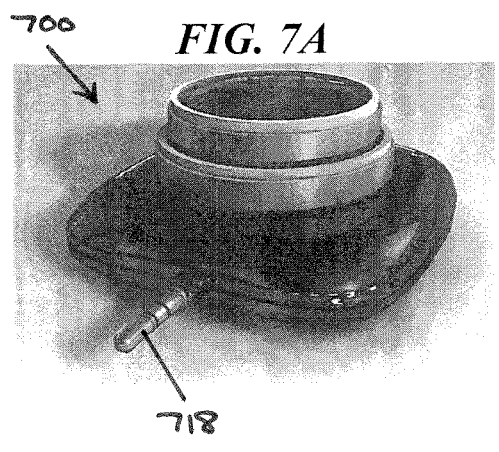
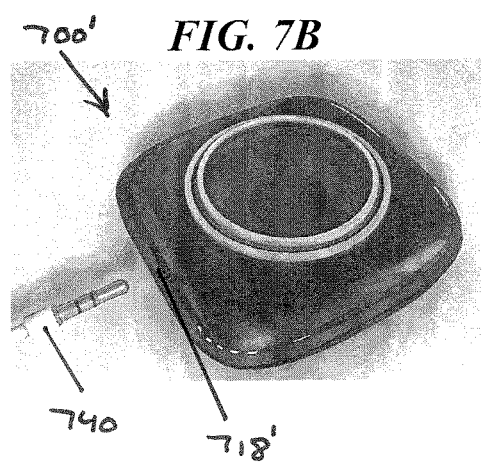

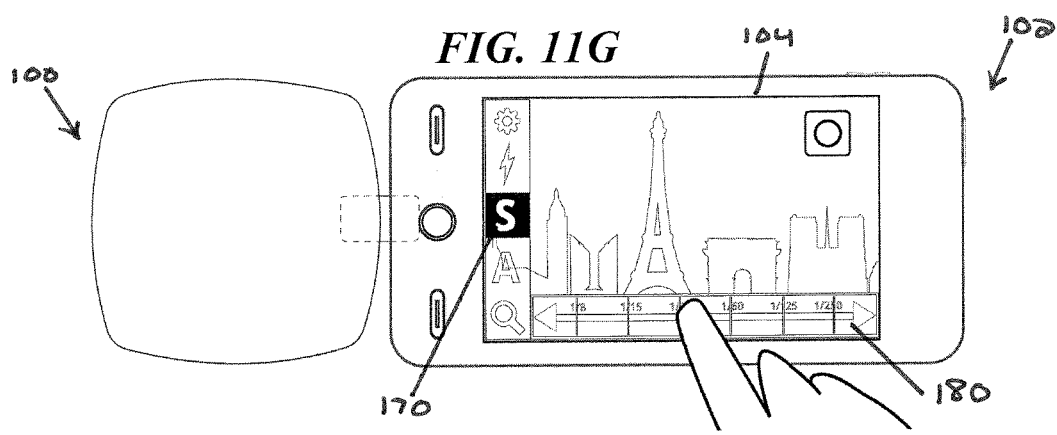
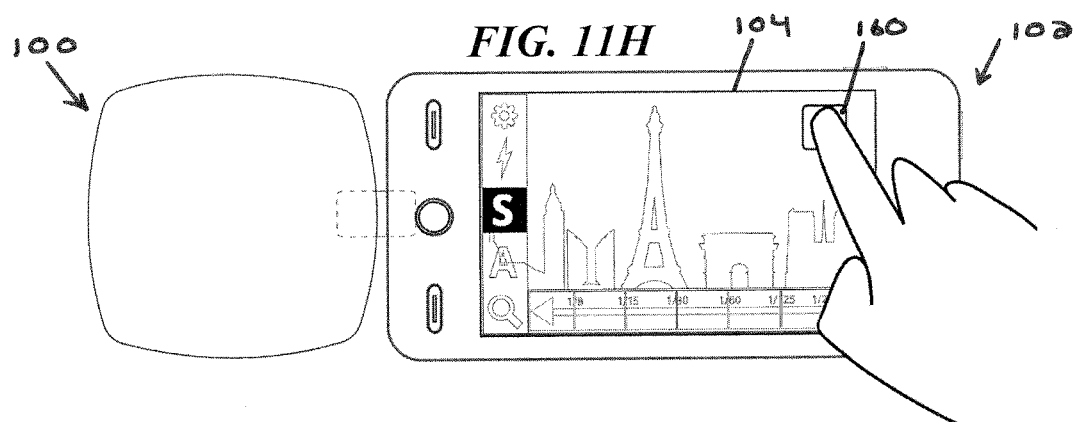

ATTACHABLE SMARTPHONE CAMERA

CROSS-REFERENCE TO RELATED APPLICATIONS

This application is a continuation of U.S. application Ser. No. 14/248,745, filed on Apr. 9, 2014, which claims priority to U.S. Provisional Application No. 61/809,922 filed on Apr. 9, 2013, each of which is hereby incorporated herein by reference in its entirety.

FIELD

The present invention relates to systems and methods for digitally capturing image data.

BACKGROUND

Photo and video capture functions are some of the most-often used features of mobile devices such as smartphones. Modern mobile devices are equipped with integrated high resolution cameras, which enable users to capture images and share them easily with other users over the internet. The images produced by such cameras can be of relatively high quality when captured in a well-illuminated environment. Image quality suffers, however, when lighting is not optimal. In addition, the small fixed lenses with small apertures typical of mobile devices limit the quality of captured images and the creativity of the user. In the end, the capabilities of mobile device cameras are lacking as compared with dedicated digital cameras.

Dedicated digital cameras (e.g., compact point-and-shoot cameras and digital single lens reflex (DSLR) cameras) are capable of taking high quality images in varying lighting conditions and can be outfitted with a wide range of fixed and movable lenses. These cameras, however, lack the portability and convenience of typical mobile devices, and are not well equipped for sharing images via email, text message, social media, and so forth.

Accordingly, a need exists for a system with the portability, convenience, and connectivity of a mobile device and the image quality, flexibility, and performance of a dedicated digital camera.

SUMMARY

Systems and methods are disclosed herein that generally involve a camera system including a high-quality lens which is selectively attachable to a mobile device, effectively replacing the mobile device's integral lens. The attachable camera system can leverage existing features of the mobile device, such as the display, battery, storage, and sharing functions, allowing the camera system itself to be a relatively simple, lightweight, portable, and inexpensive device. The ability to selectively attach and detach the camera system from the mobile device allows the camera system to be removed when it is desired to maintain the mobile device's favorable weight, size, and ergonomic characteristics. When high quality image or video capture or increased camera flexibility and functionality is desired, the camera system can be attached to the mobile device.

In some embodiments, a camera system includes a camera housing, a lens mounted in the housing and configured to direct light onto an image sensor disposed within the housing, and a mobile device connector configured to mechanically and electrically couple the camera system to a mobile device. In some embodiments, the camera system does not include a user interface. In some embodiments, the camera system does not include a power source and is instead configured to receive power through the connector from a mobile device when the camera system is coupled to the mobile device. In some embodiments, the camera system does not include a storage medium and is instead configured to transmit captured image data through the connector to a mobile device for storage on the mobile device when the camera system is coupled to the mobile device. In some embodiments, the camera system does not include a shutter button or a display screen. The connector can include at least one of a micro-USB connector, a mini-USB connector, an Apple® 30-pin connector, an Apple® Lightning port connector, and a jack connector. The image sensor can have a resolution of at least about 10 megapixels. The lens can have an adjustable focal length. The lens can be positionable in at least a fully-retracted position and a fully-extended position. The lens can include a mechanical shutter. The housing can have a length of less than about six centimeters, a width of less than about six centimeters, and a depth of less than about two centimeters. The system can include an external flash connector and an external flash configured to be electrically and mechanically coupled to the camera housing by the external flash connector. The external flash connector can be disposed along an edge of the camera housing that is opposite from an edge of the camera housing along which the mobile device connector is disposed. The external flash connector can be disposed along an edge of the camera housing that is adjacent to an edge of the camera housing along which the mobile device connector is disposed. The system can include a cradle configured to receive at least a portion of a mobile device. The cradle can include a base and four sidewalls that define a recess which is a substantial negative of at least a portion of a mobile device. The cradle can be configured to receive at least a portion of a mobile device in an interference fit. The cradle can be formed from an elastomeric material. The system can include a platform formed on or attached to the camera housing and configured to abut a sidewall of a mobile device when the camera system is coupled to the mobile device. The platform can include one or more connection features configured to mechanically couple the camera system to a mobile device. The connection features can include at least one of a magnet, a hook, a strap, and a screw.

In some embodiments, a method of capturing image data includes coupling a camera system having a camera housing, a lens, an image sensor, and no user interface to a mobile device having a processor, a display screen, and an input device, the camera system being external to a housing of the mobile device. The method can include launching a camera application on the mobile device to display on the display screen a control for adjusting a parameter of the camera system and a viewfinder comprising a real-time stream of images received by the image sensor through the lens. The method can include actuating the control using the input device of the mobile device to cause the processor of the mobile device to send an instruction to the camera system to adjust the parameter. The method can include actuating a shutter control of the mobile device to cause the processor of the mobile device to send an instruction to the camera system to perform an image capture operation, said image capture operation comprising generating image data using the image sensor of the camera system and transmitting the generated image data to the mobile device for storage or processing. The parameter can include at least one of shutter speed, aperture size, zoom, focus, and flash setting. The image data can include at least one of still image data, video image data, and video audio data captured by a microphone.

In some embodiments, a method of capturing image data using a camera system coupled to a mobile device is provided, the camera system being external to a housing of the mobile device and having a camera housing, a lens, an image sensor, a lens controller, a connector, and no user interface, the mobile device having a processor, a display screen, and an input device. The method can include, using the processor of the mobile device, executing a camera application to display on the display screen of the mobile device one or more controls for adjusting parameters of the camera system. The method can include, using the processor of the mobile device, executing the camera application to display on the display screen of the mobile device a real-time stream of images captured by the image sensor through the lens and transmitted to the mobile device through the connector such that the display screen acts as a viewfinder for the camera system. The method can include receiving, via the input device, a user instruction to adjust a parameter of the camera system and sending an instruction to adjust the parameter of the camera system from the processor to the lens controller via the connector. The method can include receiving, via the input device, a user instruction to perform an image capture operation and sending an instruction to perform an image capture operation from the processor to the lens controller via the connector. The method can include receiving, at the processor of the mobile device, image data captured through the lens by the image sensor of the camera system, and storing the received image data in a storage unit of the mobile device. The image data can include at least one of still image data, video image data, and video audio data captured by a microphone. The display screen can be a touch-enabled display and the input device can include a touch sensor of the touch-enabled display.

In some embodiments, a method of capturing image data using a camera system attached to a mobile device is provided, the camera system being external to a housing of the mobile device and having a camera housing, a lens, an image sensor, a processor, a connector, and no user interface, the mobile device having a display screen. The method can include receiving, at the processor of the camera system, an instruction from the attached mobile device to adjust a parameter of the camera system. The method can include, in response to said instruction, adjusting the parameter of the camera system. The method can include transmitting a real-time feed of images captured through the lens by the image sensor to the attached mobile device for display as a viewfinder on the display screen of the mobile device. The method can include receiving, at the processor of the camera system, an instruction from the attached mobile device to perform an image capture operation. The method can include, in response to said instruction, performing an image capture operation using the lens and the image sensor. The method can include transmitting to the attached mobile device, via the connector, image data captured through the lens by the image sensor during the image capture operation. The image data can include at least one of still image data, video image data, and video audio data captured by a microphone. The parameter can include at least one of shutter speed, aperture size, zoom, focus, and flash setting.

The present invention further provides devices, systems, and methods as claimed.

BRIEF DESCRIPTION OF THE DRAWINGS

The invention will be more fully understood from the following detailed description taken in conjunction with the accompanying drawings, in which:

FIG. 6A is a perspective view of a camera system with a female connector, shown with the lens in an extended configuration;

FIG. 6B is a perspective view of the camera system of FIG. 6A, shown with the lens in a retracted configuration;

FIG. 6C is a front view of the camera system of FIG. 6A;

FIG. 6D is a rear view of the camera system of FIG. 6A;

FIG. 7A is a perspective view of a camera system with a male jack connector, shown with the lens in an extended configuration;

FIG. 7B is a perspective view of a camera system with a female jack connector, shown with the lens in a retracted configuration;

FIG. 11G is a schematic view of the user interface of FIG. 11A with a shutter control slider being actuated by a user;

FIG. 11H is a schematic view of the user interface of FIG. 11A with a shutter button being actuated by a user.

DETAILED DESCRIPTION

Systems and methods are disclosed herein that generally involve a camera system including a high-quality lens which is selectively attachable to a mobile device, effectively replacing the mobile device's integral lens. The attachable camera system can leverage existing features of the mobile device, such as the display, battery, storage, and sharing functions, allowing the camera system itself to be a relatively simple, lightweight, portable, and inexpensive device. The ability to selectively attach and detach the camera system from the mobile device allows the camera system to be removed when it is desired to maintain the mobile device's favorable weight, size, and ergonomic characteristics. When high quality image or video capture or increased camera flexibility and functionality is desired, the camera system can be attached to the mobile device. The systems and methods disclosed herein can thus allow a user to avoid having to carry both a mobile device and a dedicated digital camera. Instead, the user can capture high quality photos and videos using just their mobile device and a lightweight, portable camera system.

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Figure 1:
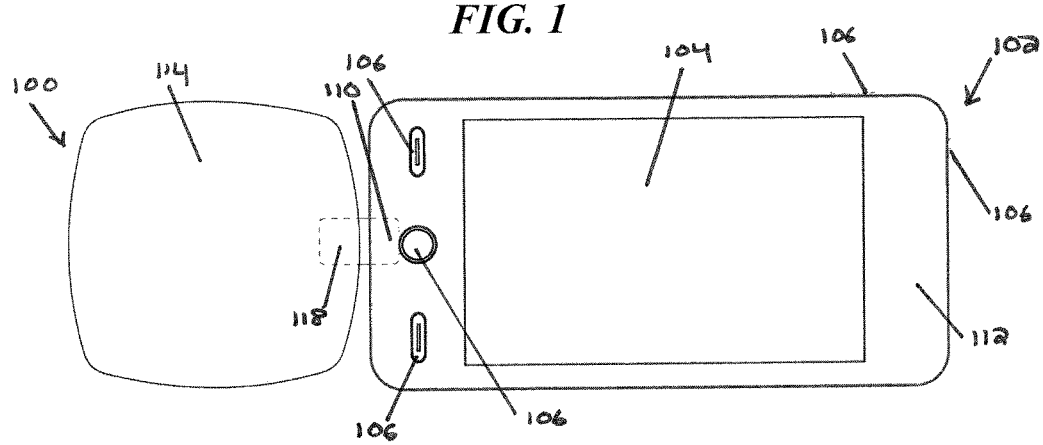
FIG. 1 is a rear view of a camera system coupled to a mobile device.
Figure 2:
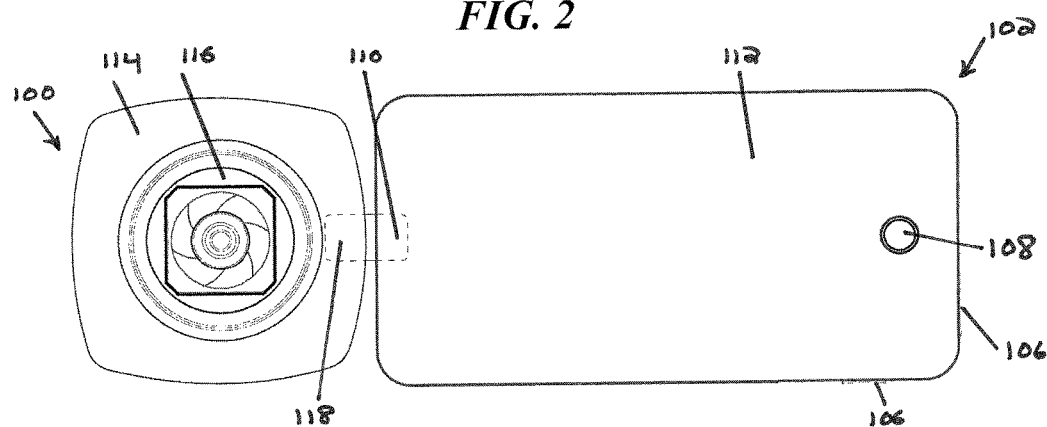
FIG. 2 is a front view of the camera system and mobile device of FIG. 1.

FIGS. 1-2 illustrate an exemplary embodiment of a camera system 100 that is configured for use with a mobile device 102. The mobile device 102 can be any of a variety of well-known devices, including cell phones, smart phones, tablet computers, laptop computers, hand-held computers, personal computers, music players, and the like. In the illustrated embodiment, the mobile device 102 is a smart phone that includes a touch-enabled display 104, one or more hardware buttons 106, an integrated flash 108, a peripheral interface 110, and a housing 112.

The camera system 100 generally includes a housing 114 in which a lens 116 is mounted. The housing 114 and the other components of the camera system 100 are external to the housing of the mobile device 102. The camera system 100 also includes a mobile device interface 118 through which the camera system can communicate with the mobile device 102. Notably, the illustrated camera system 100 does not include various features which are typical of a dedicated digital camera, such as a display screen, shutter button, control pad, or other user interface. Instead, the user interface is implemented by the mobile device 102. The camera system 100 is controlled by the mobile device 102, and can transmit captured images and video to the mobile device 102 for processing, storage, sharing, etc. The illustrated camera system 100 thus provides a simple, compact, lightweight, and inexpensive solution that significantly improves the photographic capabilities of the mobile device 102.

Figure 3:
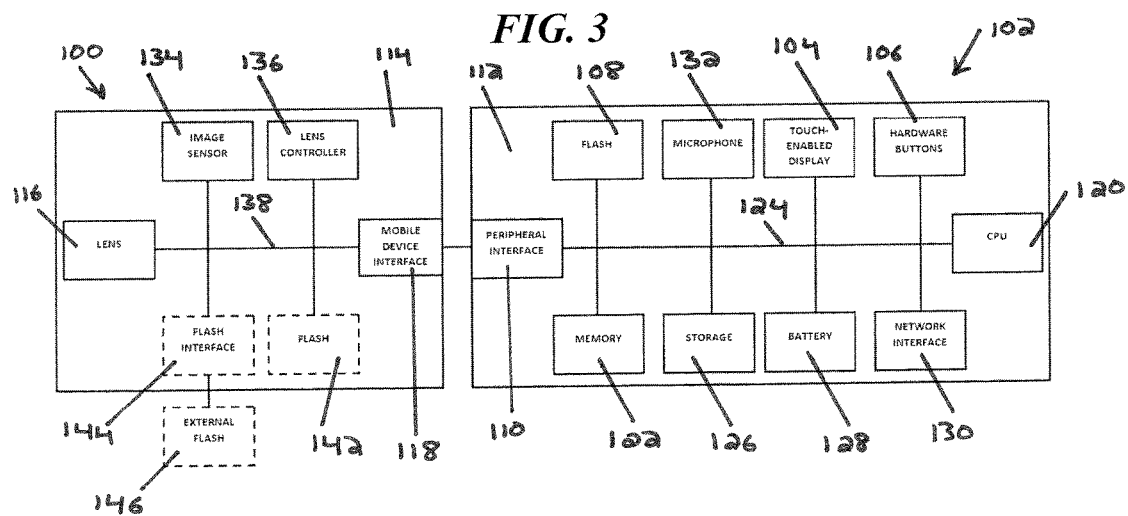
FIG. 3 is a schematic block diagram of the camera system and mobile device of FIG. 1.

The camera system 100 and the mobile device 102 are illustrated in more detail in the schematic block diagram shown in FIG. 3. The illustrated mobile device 102 includes a processor 120 which controls the operation of the mobile device, for example by executing an operating system (OS), device drivers, application programs, and so forth. The processor 120 can include any type of microprocessor or central processing unit (CPU), including programmable general-purpose or special-purpose microprocessors and/or any of a variety of proprietary or commercially-available single or multi-processor systems. The mobile device 102 also includes a memory 122, which provides temporary or permanent storage for code to be executed by the processor 120 or for data that is processed by the processor. The memory 122 can include read-only memory (ROM), flash memory, one or more varieties of random access memory (RAM), and/or a combination of memory technologies. The various elements of the mobile device 102 are coupled to a bus system 124. The illustrated bus system 124 is an abstraction that represents any one or more separate physical busses, communication lines/interfaces, and/or multi-drop or point-to-point connections, connected by appropriate bridges, adapters, and/or controllers.

The mobile device 102 also includes a storage device 126, a battery or other power source 128, a network interface 130, one or more hardware buttons 106, a touch-enabled electronic display 104, a microphone 132, a flash 108, and a peripheral interface 110.

The storage device 126 can include any conventional medium for storing data in a non-volatile and/or non-transient manner. The storage device 126 can thus hold data and/or instructions in a persistent state (i.e., the value is retained despite interruption of power to the mobile device 200). The storage device 126 can include one or more hard disk drives, flash memories, USB drives, optical drives, various media disks or cards, and/or any combination thereof and can be directly connected to the other components of the mobile device 102 or remotely connected thereto, such as over a network. The battery 128 provides operating power for the mobile device 102 and, optionally, for the camera system 100 as discussed further below. The network interface 130 enables the mobile device 102 to communicate with remote devices (e.g., computer systems or other mobile devices) over a network. Exemplary network interfaces include cellular voice and/or data network transceivers, as well as Wi-Fi, Bluetooth, NFC, and IR transceivers. The hardware buttons 106 can be actuated by a user to provide input or otherwise interact with the mobile device 102. The touch-enabled electronic display 104 displays images, including a graphical user interface, in accordance with instructions received from the processor 120. The display 104 can also receive user inputs to allow the user to interact with the mobile device 102. The microphone 132 receives and converts acoustic energy into electronic signals for processing and/or storage by the mobile device 102. The flash 108 is a light source (e.g., one or more LEDs or incandescent bulbs) that can be actuated by the processor 120 to illuminate a scene in connection with photo or video capture. The peripheral interface 110 facilitates battery charging and communication between the mobile device 102 and various input or output devices operatively coupled thereto, including the camera system 100. The peripheral interface 110 can be a wireless or wired connection with appropriate buffers, amplifiers, and so forth. In the case of a wired connection, the peripheral interface 110 can include a physical connector with one or more electrical contacts. Exemplary connectors include micro-USB, mini-USB, Apple® 30-pin, Apple® Lightning port, and stereo, mono, or multi-conductor "headphone" or "jack" connectors.

It will be appreciated that the illustrated mobile device 102 is merely exemplary, and that the mobile device can include fewer or more components that what is shown and described herein.

The illustrated camera system 100 includes a housing 114, a lens 116, an image sensor 134, a processor or lens controller 136, and a mobile device interface 118. The various elements of the camera system 100 are coupled to a bus system 138. The illustrated bus system 138 is an abstraction that represents any one or more separate physical busses, communication lines/interfaces, and/or multi-drop or point-to-point connections, connected by appropriate bridges, adapters, and/or controllers.

The housing 114 can be formed from metal (e.g., a lightweight alloy), plastic, or any other material or combination of materials. The size of the housing 114 can be selected based on various parameters, such as the size of the lens 116 or based on the size of the mobile device(s) 102 with which the camera system 100 is designed to operate. In some embodiments, the housing 114 can have a width approximately equal to the width of the mobile device 102, a length approximately equal to said width, and a thickness approximately equal to the thickness of the mobile device. In some embodiments, the camera system 100 can be slightly thicker than the mobile device 102 to accommodate a larger lens. In an exemplary embodiment, the housing 114 can have a length of less than about six centimeters, a width of less than about six centimeters, and a thickness of less than about two centimeters. In another exemplary embodiment, the housing 114 can have a length of about one centimeter greater than the external diameter of the lens 116 and a width of about one centimeter greater than the external diameter of the lens. In some embodiments, the camera system 100 can be relatively lightweight. For example, the camera system 100 can weigh less than about 150 grams.

Figure 4A:
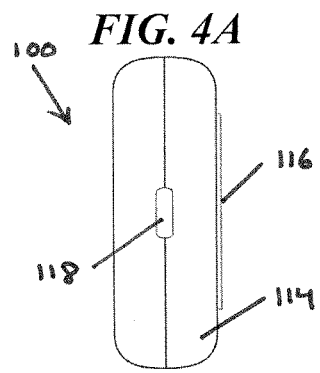
FIG. 4A is a side view of the camera system of FIG. 1 with the lens in a retracted position.
Figure 4B:
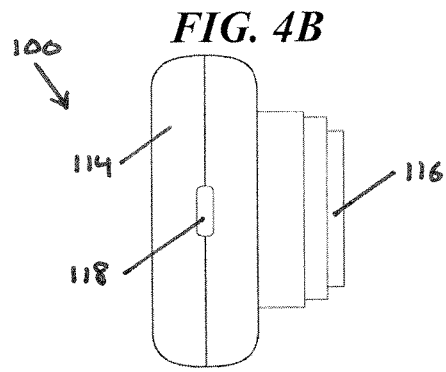
FIG. 4B is a side view of the camera system of FIG. 1 with the lens in an extended position.

The lens 116 includes one or more optical elements configured to direct light onto the image sensor 134. The lens 116 can be partially or fully retractable, as shown in FIGS. 4A-4B. In particular, the lens 116 can be positionable in a first, fully-retracted position (shown in FIG. 4A) in which the lens is partially or fully retracted into the housing 114. The lens 116 can also be positionable in a second, fully-extended position (shown in FIG. 4B) in which the lens at least partially extends out of the housing 114. The lens 116 can also be positionable in any of a variety of positions between said first and second positions. The lens 116 can be configured to automatically transition to the first position when the camera system 100 is disconnected from the mobile device 102. To that end, the camera system 100 can include a capacitor or battery to provide power for retracting the lens 116 when the camera system is disconnected from the mobile device 102. The lens 116 can also be configured to automatically transition to the second position when the camera system 100 is connected to the mobile device 102. In some embodiments, the lens 116 is a telescoping lens.

The lens 116 can have a fixed focal length or an adjustable focal length. For example, the lens can have a fixed focal length of 12 mm, 35 mm, 50 mm, 85 mm, or any other value, or a focal length that is adjustable between 55 mm and 200 mm, between 18 mm and 200 mm, between 75 mm and 300 mm, between 12 mm and 1200 mm, or any other range. In some embodiments, the lens can be adjusted to a focal length of at least 35 mm, and preferably at least 70 mm, and preferably at least 150 mm. The lens 116 can include manual or automatic zoom functionality. The lens 116 can include one or more motors, actuators, gears, etc. for adjusting the focal length, aperture size, shutter speed, and other parameters of the lens. The lens 116 can include a mechanical shutter. In some embodiments, the housing 114 can include a modular lens receiver such that a user can attach any of a variety of lenses to the camera system 100. Exemplary lenses 116 include prime lenses, normal lenses, wide-angle lenses, fisheye lenses, telephoto lenses, zoom lenses, anamorphic lenses, catadioptric lenses, lenses of varying focal lengths or varying ranges of focal lengths, etc. In some embodiments, the lens 116 can have high speed autofocus. The lens 116 can have an adjustable aperture (e.g., f/1.4, f/2.8, f/4, f/5.6, f/8, f/11, f/16, etc.) and an adjustable shutter speed (e.g., $\frac{1}{1000}$ s, $\frac{1}{500}$ s, $\frac{1}{250}$ s, $\frac{1}{125}$ s, $\frac{1}{60}$ s, $\frac{1}{30}$ s, $\frac{1}{15}$ s, $\frac{1}{8}$ s, $\frac{1}{4}$ s, $\frac{1}{2}$ s, 1 s, etc.). In some embodiments, the lens can be adjusted to an aperture of at least f/4, and preferably at least f/2.8, and preferably at least f/1.4.

The image sensor 134 can be or can include any of a variety of known devices configured to convert an optical image into an electronic signal. Exemplary image sensors 134 include charge-coupled devices (CCD) and active pixel sensors in complementary metal-oxide-semiconductor (CMOS) and N-type metal-oxide-semiconductor (NMOS) technologies. In some embodiments, the image sensor 134 has a resolution of at least about 10 megapixels. The image sensor 134 can be configured to capture full color still and video images. In some embodiments, the image sensor 134 is configured to capture full 1080p high definition video. In some embodiments, the image sensor 134 is a full-frame image sensor.

The lens controller or processor 136 is configured to adjust various parameters of the lens 116 and/or image sensor 134 based on commands received from the mobile device 102. The lens controller 136 can adjust the focal length, aperture size, shutter speed, and so forth of the lens 116.

The mobile device interface 118 facilitates communication between the camera system 100 and the mobile device 102. The mobile device interface 118 can be a wireless or wired connection with appropriate buffers, amplifiers, and so forth. In the case of a wired connection, the mobile device interface 118 can include a physical connector with one or more electrical contacts. The physical connector can electrically and mechanically couple the camera system 100 to the mobile device 102. Exemplary connectors include micro-USB, mini-USB, Apple® 30-pin, Apple® Lightning port, and stereo, mono, or multi-conductor "headphone" or "jack" connectors. Other exemplary connectors include forthcoming internationally standardized universal connectors for mobile devices. In some embodiments, the connector can be complementary to the connector type used in the mobile device 102. In other words, when the peripheral interface 110 of the mobile device 102 includes a female connector, the mobile device interface 118 of the camera system 100 can include a male connector and vice versa. In other embodiments, the mobile device 102 and the camera system 100 can include matching connector types (e.g., male and male or female and female), in which case an intermediate cord, dongle, or adapter can be included to couple the mobile device 102 to the camera system 100. The mobile device and peripheral interfaces 118, 110 can provide power and data connections between the camera system 100 and the mobile device 102. Accordingly, the camera system 100 can be powered by the mobile device 102, can receive control instructions from the mobile device, and can send captured image, video, and/or audio data to the mobile device.

In some embodiments, the connector can be rotatable about one or more axes relative to the housing 114 such that the lens 116 can be aimed in any of a variety of directions when the camera system 100 is coupled to the mobile device 102. For example, the lens 116 can be aimed in a direction that is opposite the direction in which the display 106 faces as shown in the drawings, or the connector can be rotated such that the lens 116 is aimed in the same direction that the display faces. The connector can also be rotated to aim the lens 116 in any other direction relative to the mobile device 102 (e.g., up, down, left, right, etc.).

In some embodiments, the connector can be coupled to the mobile device 102 in multiple orientations. For example, the camera system 100 can be connected to the mobile device 102 such that the lens faces forward as shown, or can be connected in an opposite orientation such that the lens instead faces rearward. A user can thus quickly change between a front-facing lens and a rear-facing lens (or vice versa) simply by disconnecting the camera system, rotating it 180 degrees, and reattaching it to the mobile device 102.

Figure 5A:
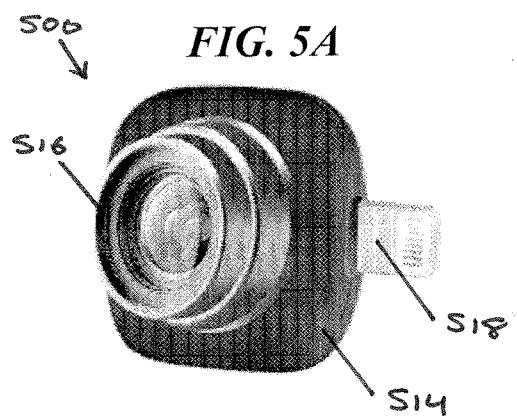
FIG. 5A is a perspective view of a camera system with a male connector, shown with the lens in an extended configuration.
Figure 5B:
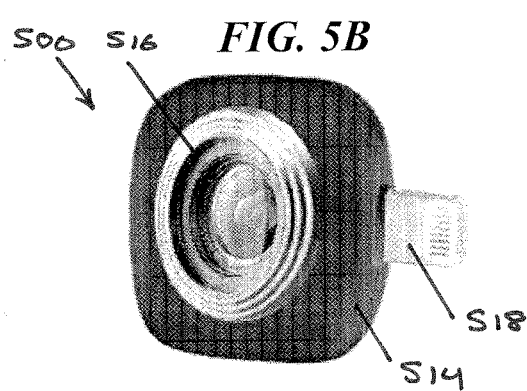
FIG. 5B is a perspective view of the camera system of FIG. 5A, shown with the lens in a retracted configuration.
Figure 5C:
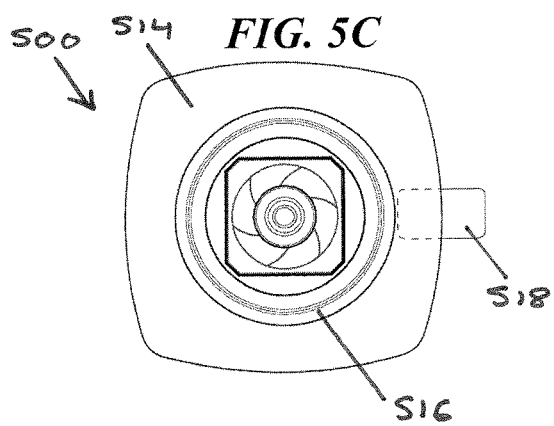
FIG. 5C is a front view of the camera system of FIG. 5A.
Figure 5D:
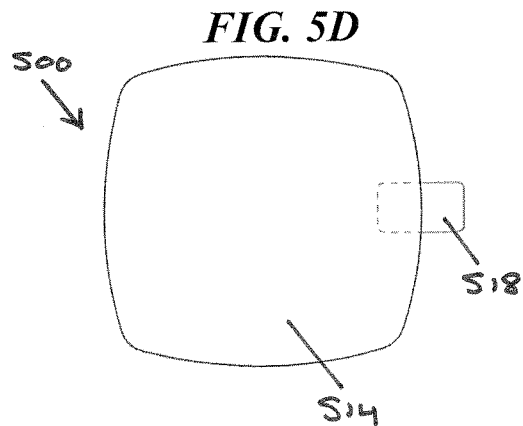
FIG. 5D is a rear view of the camera system of FIG. 5A.

FIGS. 5A-5D illustrate an exemplary embodiment of a camera system 500 with a male lightning port connector 518 that protrudes from the housing 514 and is configured to mate with a corresponding female lightning port of a mobile device. The camera system 500 is shown with the lens 516 extended in FIG. 5A and retracted in FIG. 5B. FIGS. 5C and 5D illustrate front and rear views, respectively, of the camera system 500 of FIGS. 5A and 5B.

FIGS. 6A-6D illustrate an exemplary embodiment of a camera system 600 with a female lightning port connector 618 that is recessed into the housing 614. The female connector 618 of the camera system 600 can be configured to mate with a corresponding female lightning port of a mobile device via an intermediate male-male adapter cable or plug (not shown). The camera system 600 is shown with the lens 616 extended in FIG. 6A and retracted in FIG. 6B. FIGS. 6C and 6D illustrate front and rear views, respectively, of the camera system 600 of FIGS. 6A and 6B. In some embodiments, the camera system can include a female connector to allow the camera system to couple with a mobile device having a male connector. The camera system can also be supplied with a male-male adapter to allow the camera system to also couple with a mobile device having a female connector.

FIG. 7A illustrates an exemplary embodiment of a camera system 700 with a male jack connector 718. The male connector 718 of the camera system 700 can be configured to mate with a corresponding female jack connector of the mobile device.

FIG. 7B illustrates an exemplary embodiment of a camera system 700' with a female jack connector 718'. The female connector 718' of the camera system 700' can be configured to mate with a female jack connector of the mobile device via an intermediate male-male adapter cable or plug 740.

Referring again to FIG. 3, in the illustrated embodiment, power is supplied to the camera system 100 by the battery 128 of the mobile device 102 through an electrical connection between the mobile device interface 118 and the peripheral interface 110. In some embodiments, instead of or in addition to receiving power from the mobile device 102, the camera system 100 can include an on-board battery or other power source. The battery of the camera system 100 can be rechargeable and can be charged by the battery 128 of the mobile device 102 and/or by an accessory charger similar or identical to that used to charge the mobile device battery. In embodiments in which the camera system 100 includes its own battery, the camera system can be configured to use the internal battery initially and to switch to the mobile device battery when the internal battery is depleted.

In the illustrated embodiment, images captured by the image sensor 134 are communicated to the mobile device 102 via the mobile device interface 118 for processing by the mobile device's processor 120 and storage in the mobile device's storage unit 126. In some embodiments, instead of or in addition to using the mobile device's processor 120 and storage 126, the camera system 100 can include on-board processing and/or storage functions. For example, the camera system's processor 136 can be configured to perform image processing operations on raw image data captured by the image sensor 134. The camera system 100 can also include a storage unit (e.g., a removable or embedded memory or media card) for storing images and video captured by the image sensor 134.

It will be appreciated that the illustrated camera system 100 is merely exemplary, and that the camera system can include fewer or more components that what is shown and described herein. For example, the camera system 100 can optionally include a microphone or any other component typically found in a digital camera. In some embodiments, the camera system 100 can have all of the features of a typical high quality compact or DSLR camera, just without a user interface. By way of further example, the camera system 100 can optionally include an integral flash 142, or a flash interface 144 configured to physically and/or operatively couple the camera system to an external flash 146.

Figure 8A:
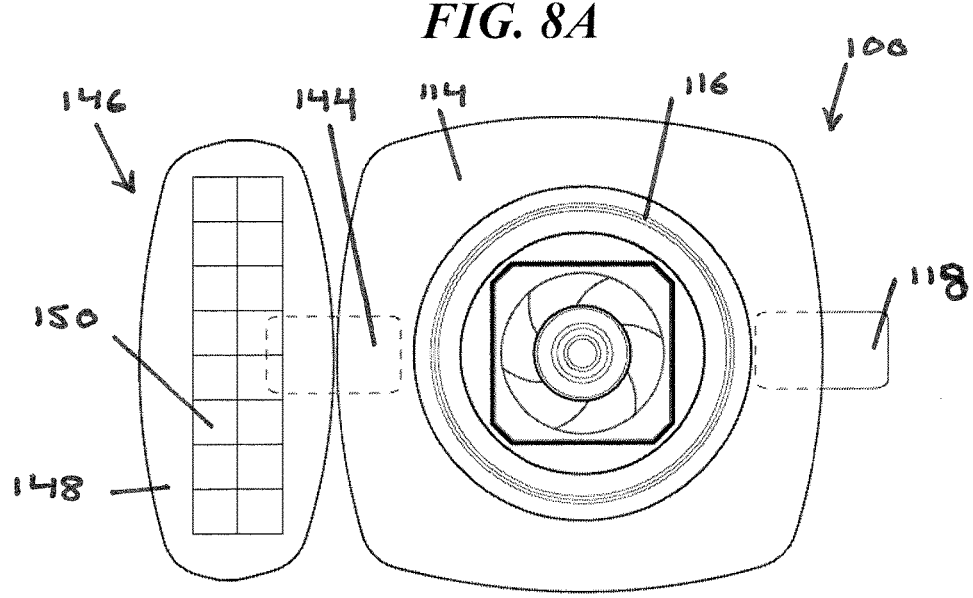
FIG. 8A is a front view of a camera system with an external flash accessory.
Figure 8B:
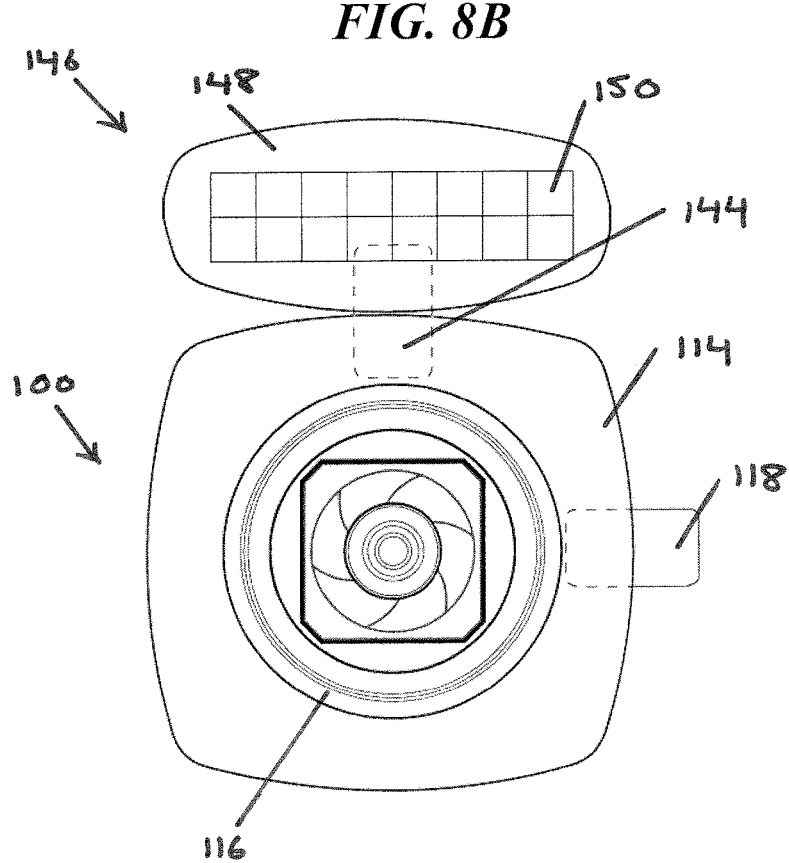
FIG. 8B is a front view of another camera system with an external flash accessory.

FIGS. 8A-8B illustrate an exemplary embodiment of a camera system 100 with an external flash 146. The external flash 146 includes a housing 148 with a light source 150 (e.g., one or more LEDs or incandescent bulbs) that can be actuated to illuminate a scene in connection with photo or video capture. The external flash 146 can also include a capacitor, battery, or other power source to power the light source 150. The external flash 146 can be mechanically and electrically coupled to the camera system 100 by any of a variety of connectors, including micro-USB, mini-USB, Apple® 30-pin, Apple® Lightning port, and stereo, mono, or multi-conductor "headphone" or "jack" connectors. The camera system 100 can include an external flash interface 144 disposed on an edge of the housing 114 which is opposite to the edge on which the mobile device interface 118 is disposed, as shown in FIG. 8A. Alternatively, or in addition, the camera system 100 can include an external flash interface 144 disposed on an edge of the housing which is adjacent to the edge on which the mobile device interface 118 is disposed, as shown in FIG. 8B. The camera system 100 can provide power and control instructions or signals to the external flash 146 through the external flash interface 144.

As noted above, the camera system 100 can be mechanically and electrically coupled, connected, and/or attached to the mobile device 102 via a connector system configured to mate the peripheral interface 110 of the mobile device with the mobile device interface 118 of the camera system. This connection can be the sole connection between the camera system 100 and the mobile device 102, or can be replaced or augmented by one or more other connection systems. Such connection systems can help stabilize the camera system 100 relative to the mobile device 102 for higher quality image and video capture.

Figure 9A:
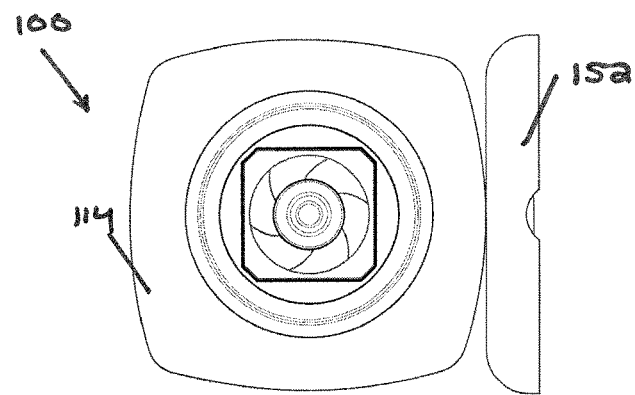
FIG. 9A is a front view of a camera system with a mobile device cradle.
Figure 9B:
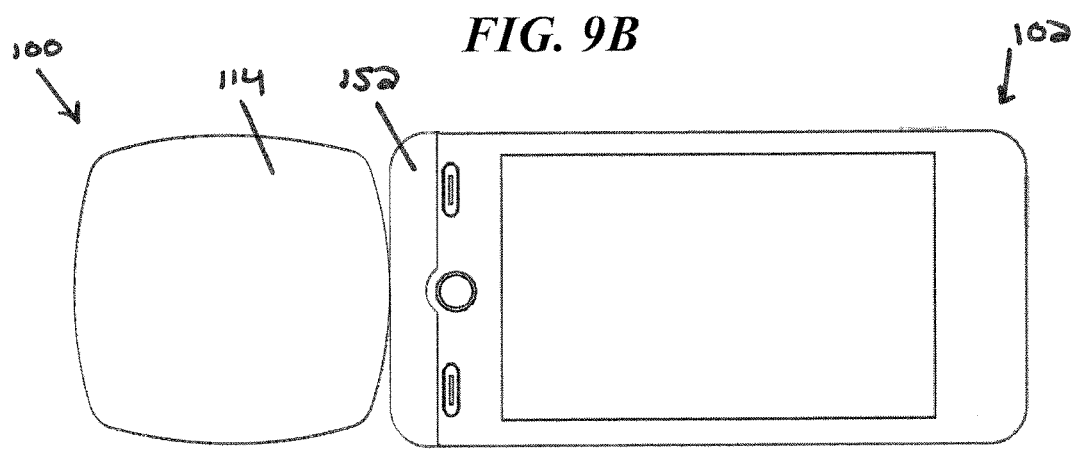
FIG. 9B is a rear view of the camera system of FIG. 9A coupled to a mobile device.
Figure 9C:
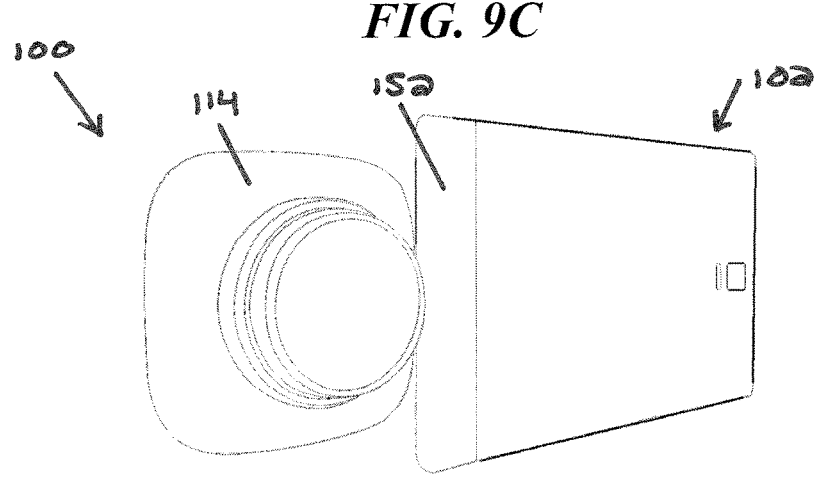
FIG. 9C is a perspective view of the camera system of FIG. 9A coupled to a mobile device.
Figure 9D:
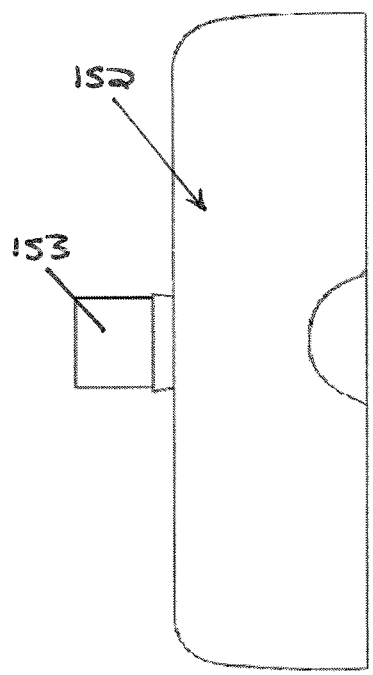
FIG. 9D is a front view of the mobile device cradle of FIG. 9A.
Figure 9E:
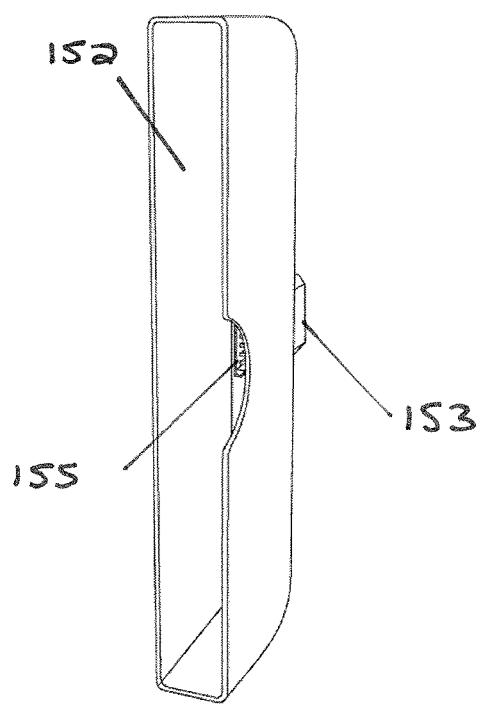
FIG. 9E is a perspective view of the mobile device cradle of FIG. 9A.

For example, as shown in FIG. 9A, the camera system 100 can include a cradle 152 configured to receive at least a portion of the housing 112 of the mobile device 102. The cradle 152 can be formed integrally with the housing 114 of the camera system 100 or can be coupled thereto using any of a variety of attachment techniques, such as adhesives, screws, interference fits, threaded connections, sonic-welding, electronic connectors of the type described above, etc. In the illustrated embodiment, the cradle 152 includes a base with four sidewalls that define a cavity which is substantially a negative of the external dimensions of a lower portion of the mobile device 102. The cradle 152 can be formed of an elastomeric material such as silicone and can dimensioned to receive the mobile device 102 in a slight interference fit, such that friction acts to maintain attachment between the mobile device and the camera system 100. The camera system 100 is shown with an attached mobile device 102 in FIGS. 9B-9C. As shown in FIGS. 9D-9E, the cradle 152 can be selectively attachable to the camera system 100, and can include a connector 153 for mating with the mobile device interface 118 of the camera system and a connector 155 for mating with the peripheral interface 110 of the mobile device 102. The cradle 152 can thus serve as an intermediate coupling between the camera system 100 and the mobile device 102. Alternatively, the cradle 152 can serve as a pass-through coupling such that a male connector of the mobile device 102 or the camera system 100 extends through the cradle to engage the counterpart device.

Figure 10A:
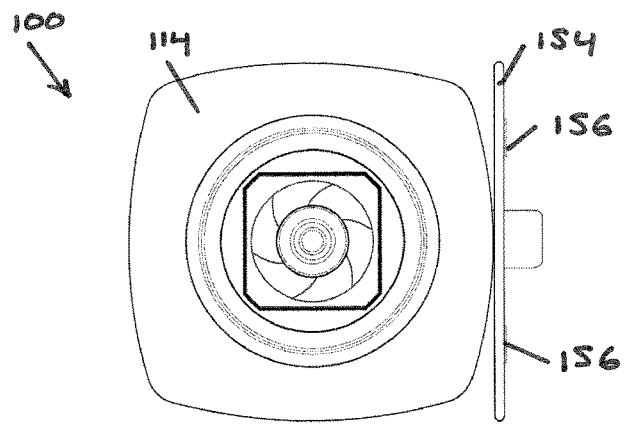
FIG. 10A is a front view of a camera system with a mobile device platform.
Figure 10B:
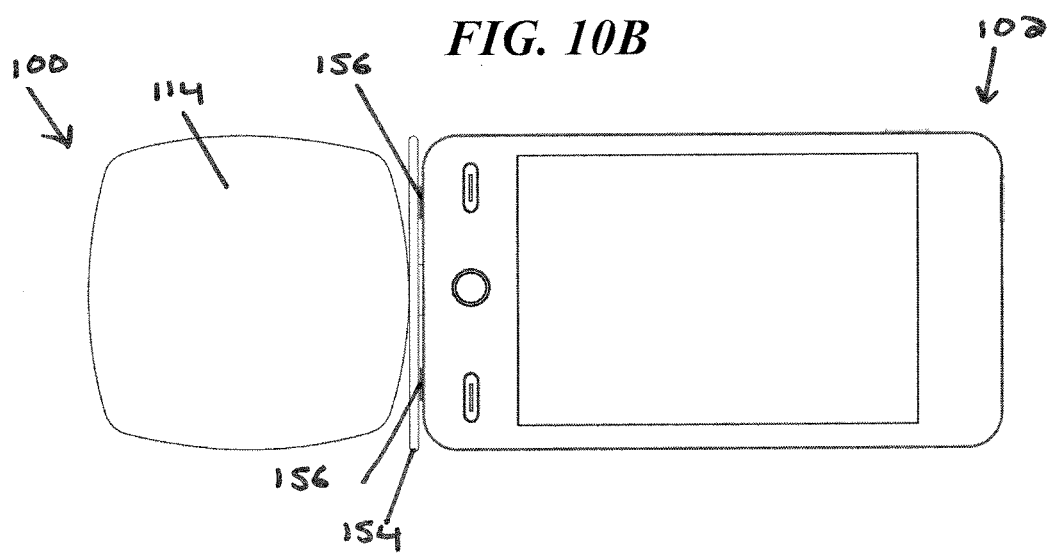
FIG. 10B is a rear view of the camera system of FIG. 10A coupled to a mobile device.
Figure 10C:
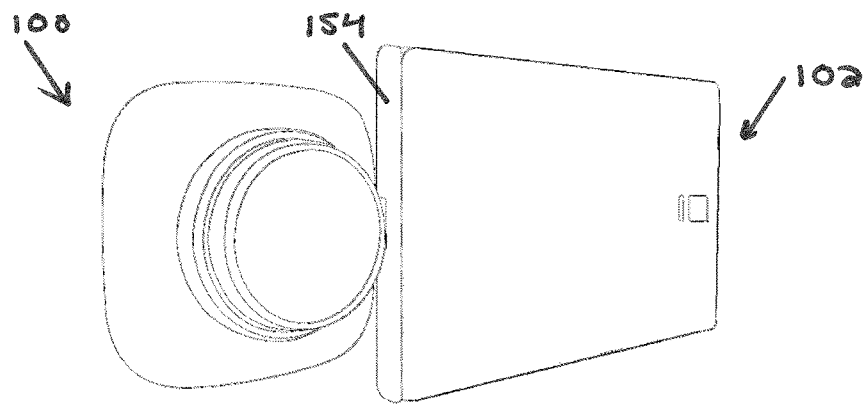
FIG. 10C is a perspective view of the camera system of FIG. 10A coupled to a mobile device.
Figure 10D:
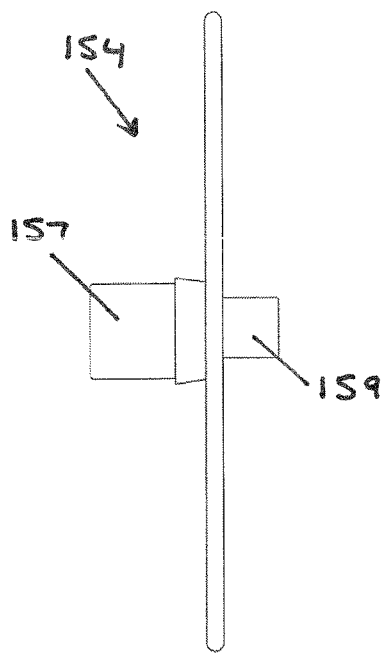
FIG. 10D is a front view of the mobile device platform of FIG. 10A.
Figure 10E:
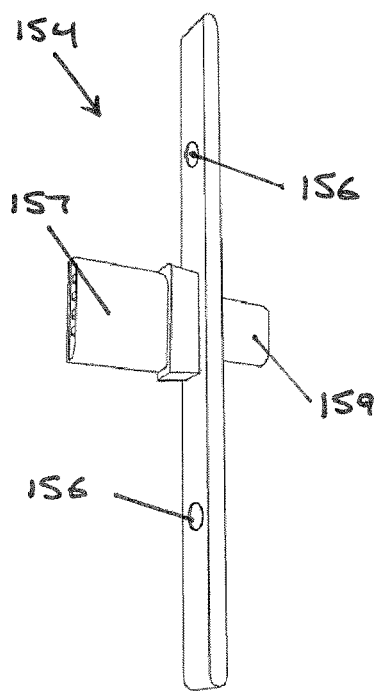
FIG. 10E is a perspective view of the mobile device platform of FIG. 10A.

By way of further example, as shown in FIG. 10A, the camera system 100 can include a platform 154 configured to abut a sidewall of the mobile device 102 when the camera system is attached to the mobile device. The platform 154 can be formed integrally with the housing 114 of the camera system 100 or can be coupled thereto using any of a variety of attachment techniques, such as adhesives, screws, interference fits, threaded connections, sonic-welding, etc. The platform 154 can include one or more connection features 156 configured to mechanically couple the camera system 100 to the mobile device 102. In some embodiments, the connection features 156 can include magnets configured to exert an attractive force on the mobile device's chassis or other metal components. The mobile device 102 can also include counterpart magnets such that the platform 154 and the mobile device are mutually attracted to one another. Various other connection features can be used instead or in addition, including hooks, straps, screws, and so forth. The camera system 100 is shown with an attached mobile device 102 in FIGS. 10B-10C. As shown in FIGS. 10D-10E, the platform 154 can be selectively attachable to the camera system 100, and can include a connector 157 for mating with the mobile device interface 118 of the camera system and a connector 159 for mating with the peripheral interface 110 of the mobile device 102. The platform 154 can thus serve as an intermediate coupling between the camera system 100 and the mobile device 102. Alternatively, the platform 154 can serve as a pass-through coupling such that a male connector of the mobile device 102 or the camera system 100 extends through the platform to engage the counterpart device.

Figure 11A:
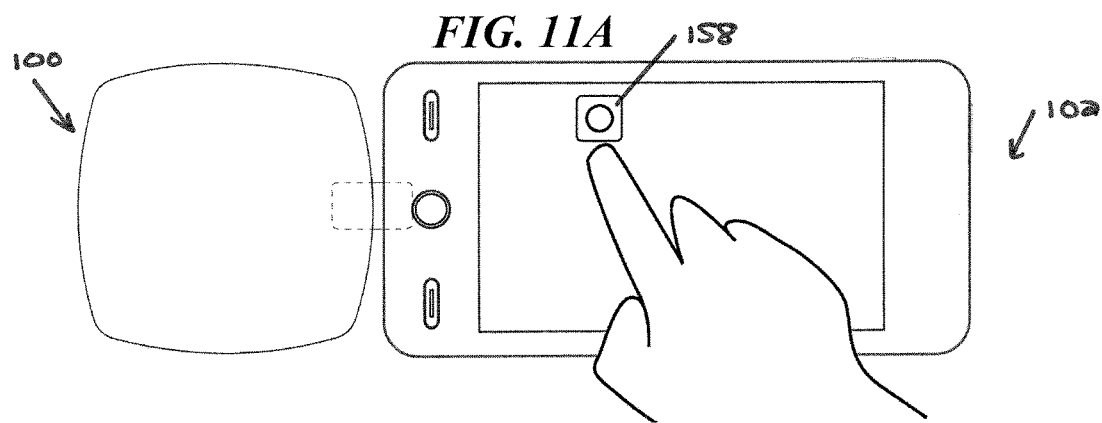
FIG. 11A is a schematic view of a user interface with a camera application icon being selected by a user.

The camera system 100 can include or can be provided with a software application installed on the mobile device 102 to provide a user interface through which a user can use the camera system and adjust various parameters of the camera system such as focus, zoom, aperture, shutter speed, flash, etc. In some embodiments, the application can be launched automatically when the camera system 100 is coupled to the mobile device 102. A user can also launch the application by selecting a camera application icon 158 as shown in FIG. 11A.

Figure 11B:
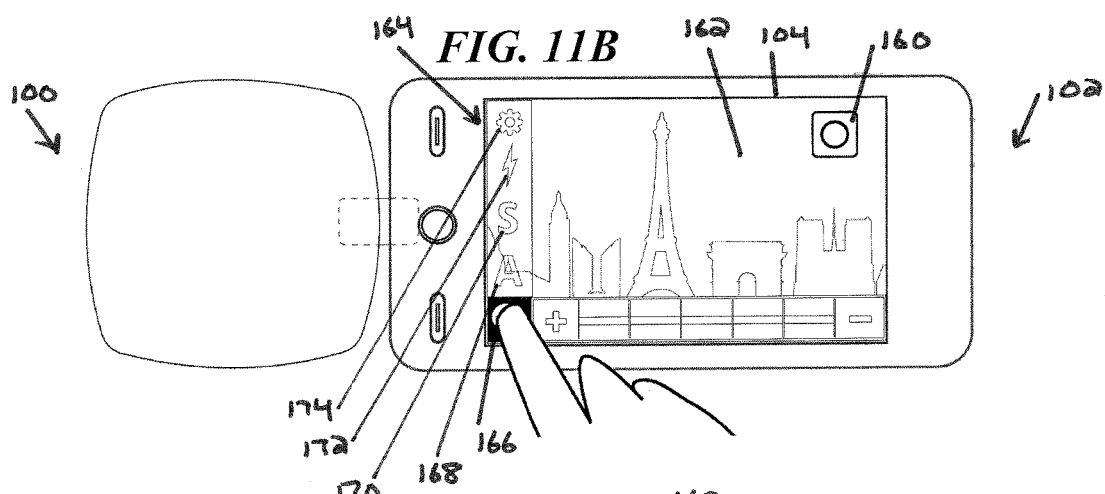
FIG. 11B is a schematic view of the user interface of FIG. 11A with a zoom control button being selected by a user.

As shown in FIG. 11B, the user interface can include a capture button 160 which can be actuated by a user to capture a still image or, when in a video capture mode, to start or stop recording of video. The user interface can also include a viewfinder display area 162 where a real-time feed of images captured by the image sensor 134 can be displayed. The user interface can also include a toolbar 164 with a plurality of buttons for selecting various functions of the camera system 100. The toolbar 164 can be displayed along a vertical edge of the mobile device's display screen 104, as shown in FIG. 11B, or in any other orientation or position on the display screen. In the illustrated embodiment, the toolbar 164 includes a zoom button 166, an aperture button 168, a shutter speed button 170, a flash button 172, and settings button 174, though it will be appreciated that fewer or more buttons can be included in the toolbar.

Figure 11C:
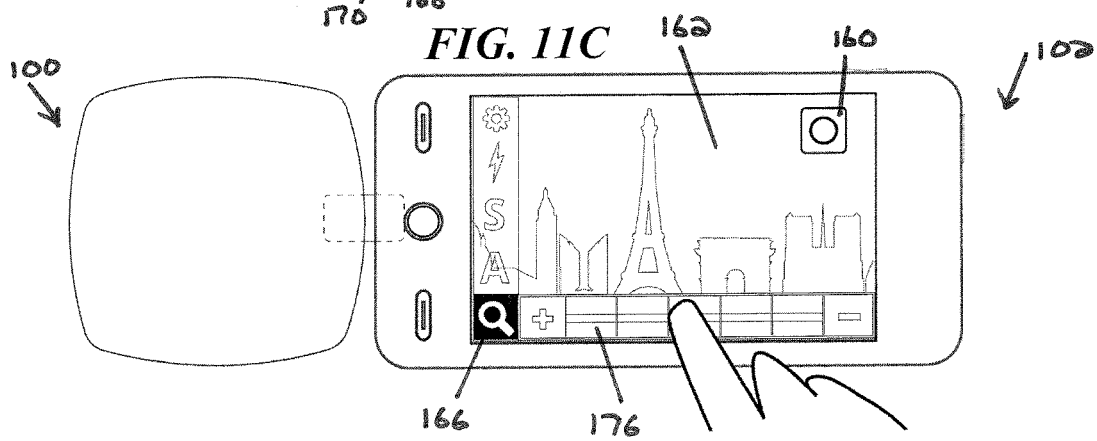
FIG. 11C is a schematic view of the user interface of FIG. 11A with a zoom control slider being actuated by a user.

As shown in FIGS. 11B-11C, selection of the zoom button 166 by a user causes a zoom slider control 176 to be displayed along a horizontal edge of the display screen 104. The user can swipe left or right on the zoom slider control 176 to zoom in or out. When the slider control 176 is actuated by a user, the processor 120 sends a signal through the peripheral interface 110 and the mobile device interface 118 to the lens controller 136 instructing the lens controller to adjust the zoom of the lens 116.

Figure 11D:
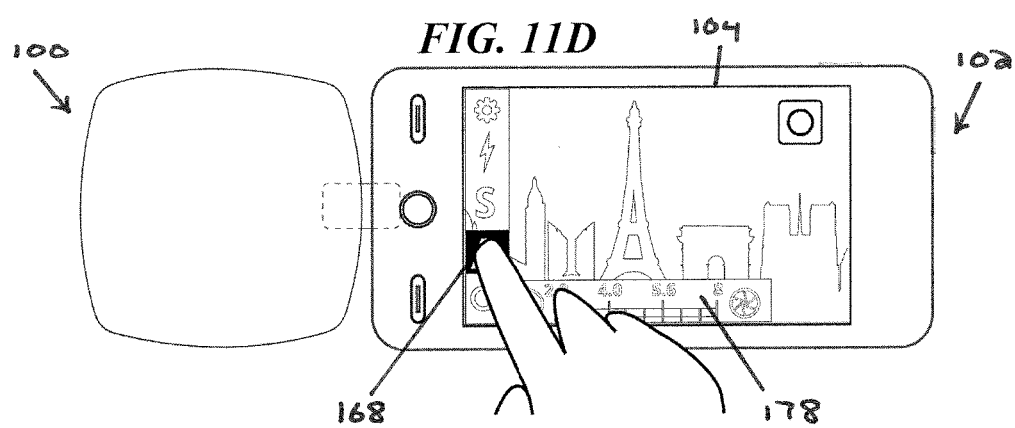
FIG. 11D is a schematic view of the user interface of FIG. 11A with an aperture control button being selected by a user.
Figure 11E:
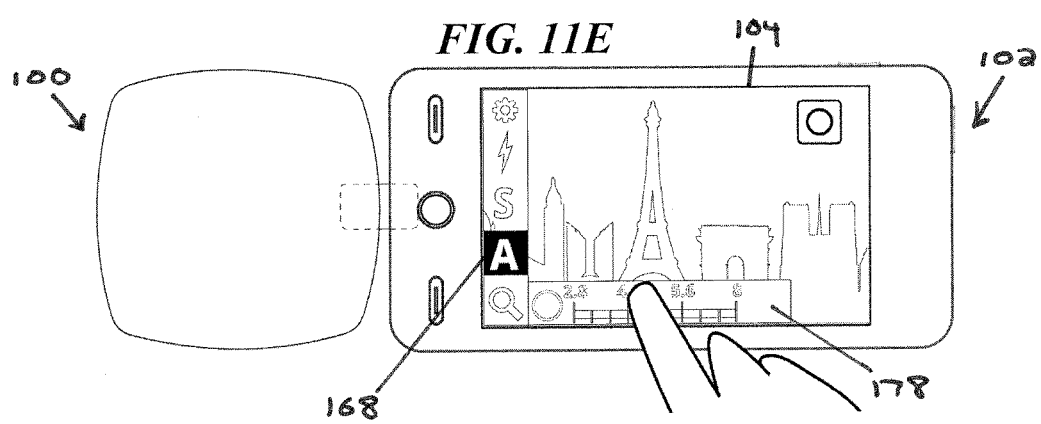
FIG. 11E is a schematic view of the user interface of FIG. 11A with an aperture control slider being actuated by a user.

As shown in FIG. 11D-11E, selection of the aperture button 168 by a user causes an aperture slider control 178 to be displayed along a horizontal edge of the display screen 104. The user can swipe left or right on the aperture slider 178 to increase or decrease the lens aperture size. When the slider control 178 is actuated by a user, the processor 120 sends a signal through the peripheral interface 110 and the mobile device interface 118 to the lens controller 136 instructing the lens controller to adjust the aperture of the lens 116.

Figure 11F:
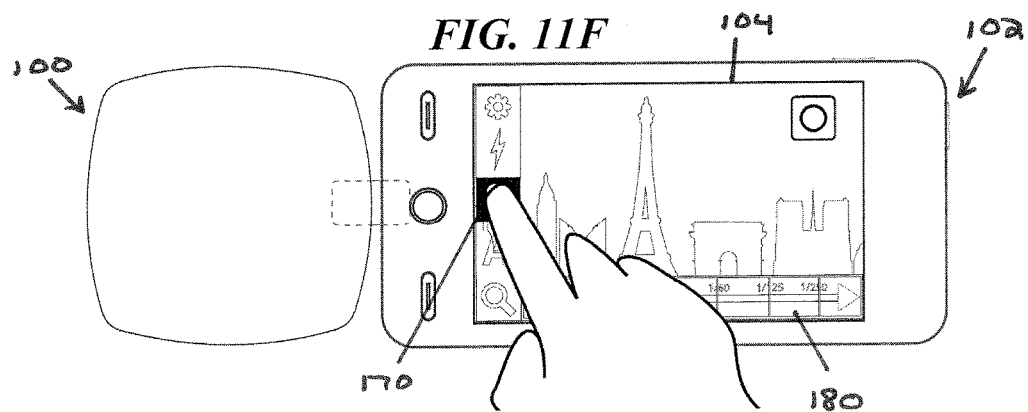
FIG. 11F is a schematic view of the user interface of FIG. 11A with a shutter control button being selected by a user

As shown in FIG. 11F-11G, selection of the shutter speed button 170 by a user causes an shutter speed slider control 180 to be displayed along a horizontal edge of the display screen 104. The user can swipe left or right on the slider 180 to increase or decrease the lens shutter speed. When the slider control 180 is actuated by a user, the processor 120 sends a signal through the peripheral interface 110 and the mobile device interface 118 to the lens controller 136 instructing the lens controller to adjust the shutter speed of the lens 116.

Selection of the flash button 172 can cause various controls for adjusting the flash 108/142/146 to be displayed, such as controls for turning the flash off, turning the flash on, setting the flash to an automatic mode, adjusting the intensity of the flash, adjusting the timing of the flash, etc.

Selection of the settings button 174 can cause various controls for adjusting the camera system 100 to be displayed, such as controls for selecting whether or not to use an on-board storage of the camera system, updating the camera application software, changing the resolution or video quality settings of the camera system, etc.

The user interface can also include controls for adjusting luminosity, applying special effects, and turning automatic focusing on or off. If the camera system 100 includes an onboard battery or memory, the user interface can display indicators showing the amount of battery life remaining or the amount of free memory space remaining.

Once the user has adjusted the camera system 100 to the desired settings, or at any other desired time, the user can actuate the capture button 160 to capture a still image, to start video recording, or to stop video recording if video recording has already begun. Upon actuation of the capture button 160, the processor 120 sends instructions to the camera system, via the peripheral interface 110 and the mobile device interface 118 to perform an image capture operation. The captured image or video can then be transmitted to the mobile device 102 for display or playback on the user interface.

Figure 12:
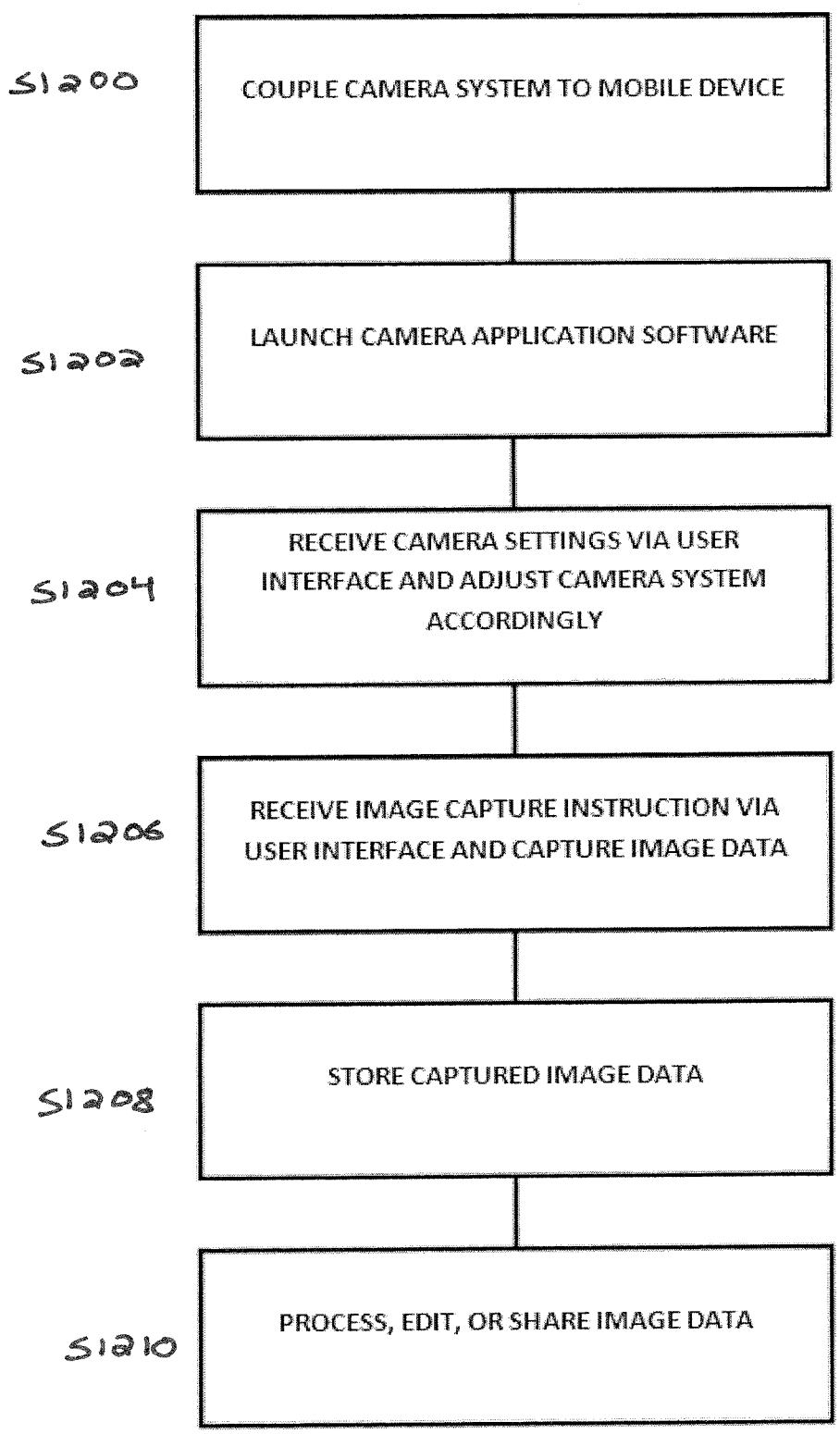
FIG. 12 is a flow chart of one exemplary method of capturing image data.

FIG. 12 illustrates an exemplary method of operating the camera system 100 and mobile device 102. While various methods disclosed herein may be shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowchart(s) are merely exemplary embodiments, various other methods that include additional steps or include fewer steps than illustrated are also within the scope of the present invention.

The illustrated method begins at step S1200, in which the camera system 100 is coupled to the mobile device 102, for example by inserting a male electrical connector of the camera system into a counterpart female connector of the mobile device. Coupling the camera system 100 to the mobile device 102 can also include positioning the mobile device within a cradle 152 of the camera system, or attaching a platform 154 of the camera system to the mobile device using magnetic attraction or some other attachment mechanism 156.

In step S1202, camera application software is launched. The software can be launched automatically when the camera system 100 is coupled to the mobile device 102 (e.g., in response to completion of a circuit when the camera system is mechanically and electrically attached to the mobile device, or in response to a signal received by the processor 120 of the mobile device indicating that the camera system has been coupled). The software can also be launched manually by user selection of a camera application icon 158 using the touch-enabled display 104 or a hardware button 106 of the mobile device. The camera system 100 can be configured to communicate image data captured by the image sensor 134 in real time to the mobile device 102 via the mobile device interface 118 and the peripheral interface 110 to allow the mobile device to serve as a viewfinder for the camera system (e.g., by displaying the real-time feed in an area 162 of the user interface). In other words, a real-time image of the scene at which the lens 116 is directed, as received and/or processed by the image sensor 134, can be displayed on the display screen 104 of the mobile device 102.

In step S1204, user interface controls of the camera application software can be actuated using the touch enabled display 104 or the hardware buttons 106 of the mobile device 102 to adjust various settings such as focus, zoom, aperture, shutter speed, flash, luminosity, still image capture mode, video capture mode, etc., as described above. The processor 120 of the mobile device 102 can receive user inputs to the camera application software and transmit corresponding instructions to the camera system 100. For example, the processor 120 can send instructions to the lens controller 136 of the camera system 100 through the peripheral interface 110 and the mobile device interface 118. The instructions can instruct the camera system 100 to adjust various parameters of the lens 116, image sensor 134, flash 142/146, etc.

In step S1206, user interface controls of the camera application software can be actuated using the touch enabled display 104 or the hardware buttons 106 of the mobile device 102 to perform an image capture operation (e.g., to capture a still image or a video). The processor 120 of the mobile device 102 can receive user inputs to the camera application software and transmit corresponding instructions to the camera system 100. For example, the processor 120 can send instructions to the lens controller 136 of the camera system 100 through the peripheral interface 110 and the mobile device interface 118. The instructions can instruct the camera system 100 to capture an image, start video capture, stop video capture, etc. When a flash function is enabled, the processor 120 can instruct the camera system 100 to actuate an onboard flash 142 or an external flash 146 coupled thereto. Alternatively, or in addition, the processor 120 can actuate the flash 108 of the mobile device 102.

In step S1208, image data captured by the camera system 100 can be stored on a local memory of the camera system or transmitted to the mobile device 102 for storage in the mobile device's storage unit 126. As used herein, image data can include still image data, video image data, and audio components of a video captured using a microphone (e.g., a microphone of the camera system 100 or the mobile device's microphone 132). In some embodiments, captured image data is transmitted through the mobile device interface 118 to the peripheral interface 110 of the mobile device 102 for storage on the mobile device.

In step S1210, the mobile device 102 can be used to process, edit, or share image data stored on the mobile device or on the camera system 100.

The various functions performed by the camera software application can be logically described as being performed by one or more modules. It will be appreciated that such modules can be implemented in hardware, software, or a combination thereof. It will further be appreciated that, when implemented in software, modules can be part of a single program or one or more separate programs, and can be implemented in a variety of contexts (e.g., as part of an operating system, a device driver, a standalone application, and/or combinations thereof). In addition, software embodying one or more modules can be stored as an executable program on one or more non-transitory computer-readable storage mediums.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

The invention claimed is:

1. A camera system, comprising:
   a camera housing;
   a lens mounted in the housing and configured to direct light onto an image sensor disposed within the housing, the lens having an adjustable focal length, aperture, and shutter speed and being positionable in at least a fully-retracted position and a fully-extended position;
   a power source configured to power extension and retraction of the lens, wherein the power source automatically retracts the lens when the camera system is disconnected from a mobile device, the power source comprising at least one of a battery and a capacitor;

a cradle configured to receive at least a portion of a mobile device, the cradle comprising a base and four sidewalls that define a recess which is a substantial negative of at least a portion of a mobile device and being configured to receive a mobile device in an interference fit; and a mobile device connector at least partially disposed within the cradle and configured to mechanically and electrically couple the camera system to a mobile device;

wherein the housing has a length of about 1 cm greater than an external diameter of the lens and wherein the housing has a width of about 1 cm greater than the external diameter of the lens; and wherein the camera system does not include a user interface.

2. The camera system of claim 1, wherein the camera system does not include a storage medium and is instead configured to transmit captured image data through the connector to a mobile device for storage on the mobile device when the camera system is coupled to the mobile device.

3. The camera system of claim 1, wherein the camera system does not include a shutter button or a display screen.

4. The camera system of claim 1, wherein the connector comprises at least one of a micro-USB connector, a mini-USB connector, an Apple® 30-pin connector, an Apple® Lightning port connector, and a jack connector.

5. The camera system of claim 1, wherein the image sensor has a resolution of at least about 10 megapixels.

6. The camera system of claim 1, wherein the lens has a mechanical shutter.

7. The camera system of claim 1, wherein the housing has a length of less than about six centimeters, a width of less than about six centimeters, and a depth of less than about two centimeters.

8. The camera system of claim 1, further comprising an external flash connector and an external flash configured to be electrically and mechanically coupled to the camera housing by the external flash connector.

9. The camera system of claim 8, wherein the external flash connector is disposed along an edge of the camera housing that is opposite from an edge of the camera housing along which the mobile device connector is disposed.

10. The camera system of claim 8, wherein the external flash connector is disposed along an edge of the camera housing that is adjacent to an edge of the camera housing along which the mobile device connector is disposed.

11. The camera system of claim 1, wherein the cradle is formed from an elastomeric material.

\* \* \* \* \*